(12) United States Patent
Maunula

(10) Patent No.: US 9,739,547 B2
(45) Date of Patent: Aug. 22, 2017

(54) ARRANGEMENT IN A THERMAL PROCESS, AND A METHOD FOR MEASURING THE THICKNESS OF A CONTAMINATION LAYER

(71) Applicant: Valmet Technologies Oy, Espoo (FI)

(72) Inventor: Joni Maunula, Tampere (FI)

(73) Assignee: VALMET TECHNOLOGIES OY, Espoo (FI)

( * ) Notice: Subject to any disclaimer, the term of this patent is extended or adjusted under 35 U.S.C. 154(b) by 195 days.

(21) Appl. No.: 14/649,542

(22) PCT Filed: Nov. 25, 2013

(86) PCT No.: PCT/FI2013/051105
§ 371 (c)(1),
(2) Date: Jun. 3, 2015

(87) PCT Pub. No.: WO2014/087045
PCT Pub. Date: Jun. 12, 2014

(65) Prior Publication Data
US 2015/0369549 A1 Dec. 24, 2015
US 2016/0245599 A2 Aug. 25, 2016

(30) Foreign Application Priority Data

Dec. 5, 2012 (FI) ........................... 20126270

(51) Int. Cl.
*G01B 11/06* (2006.01)
*F28G 15/00* (2006.01)
(Continued)

(52) U.S. Cl.
CPC ............ *F28G 15/003* (2013.01); *F23J 3/023* (2013.01); *F23M 11/042* (2013.01); *G01B 11/0616* (2013.01); *G01B 11/0625* (2013.01)

(58) Field of Classification Search
CPC ...... F23J 3/023; F23M 11/042; F28G 15/003; G01B 11/0616; G01B 11/0625
(Continued)

(56) References Cited

U.S. PATENT DOCUMENTS 5,094,695 A 3/1992 Bailey et al.
5,110,365 A * 5/1992 Carter ................ G01N 21/8422
134/113
(Continued)

FOREIGN PATENT DOCUMENTS

DE 281448 A5 8/1990
JP 2003315037 A 11/2003
(Continued)

OTHER PUBLICATIONS

International Search Report for PCT/FI2013/051105 dated Feb. 10, 2014.
(Continued)

*Primary Examiner* — Omer S Khan
(74) *Attorney, Agent, or Firm* — Stiennon & Stiennon

(57) ABSTRACT

An arrangement of a thermal device and a surface reflecting and/or scattering electromagnetic radiation in the inner part of the thermal device. A source of electromagnetic radiation is arranged at a first distance (L1) from the surface, and a detector of electromagnetic radiation is arranged at a second distance (L2) from the surface. The source is configured to emit radiation to the surface, which is reflected and/or scattered from the surface as reflected radiation. The detector receives reflected radiation; and the processing unit determines data dependent on the first and/or second distance by the emitted and reflected radiation. A wall of the thermal device has a window or aperture for emitting an optical signal from the light source to the surface. An electromagnetic distance measurement device measures the
(Continued)

thickness or the increase in the thickness of a contamination layer from a thermal device.

10 Claims, 8 Drawing Sheets

(51) Int. Cl.
   *F23M 11/04* (2006.01)
   *F23J 3/02* (2006.01)
(58) Field of Classification Search
   USPC .......................................... 340/540
   See application file for complete search history.

(56) References Cited

U.S. PATENT DOCUMENTS

| | | | | |
|---|---|---|---|---|
| 5,812,270 | A * | 9/1998 | Hampton | G01B 11/00 356/237.1 |
| 9,417,322 | B2 * | 8/2016 | Sadri | F27B 3/085 |
| 2008/0298426 | A1 * | 12/2008 | Koschack | F23J 3/02 374/7 |
| 2009/0044765 | A1 * | 2/2009 | Mussmann | F23J 3/023 122/390 |
| 2010/0225477 | A1 | 9/2010 | Livchak et al. | |
| 2010/0275857 | A1 * | 11/2010 | Bude | B08B 3/02 122/390 |
| 2011/0056313 | A1 * | 3/2011 | Dahlen | F01K 13/003 73/866.5 |
| 2011/0272865 | A1 * | 11/2011 | Shameli | F27B 3/085 266/44 |
| 2012/0100313 | A1 * | 4/2012 | Colby | B23K 26/0823 427/591 |

FOREIGN PATENT DOCUMENTS

| | | |
|---|---|---|
| JP | 2004093046 A | 3/2004 |
| JP | 2008032396 A | 2/2008 |
| WO | 2010108627 A1 | 9/2010 |

OTHER PUBLICATIONS

Written Opinion of the International Searching Authority for PCT/FI2013/051105 dated Feb. 10, 2014.
Written Opinion of the International Preliminary Examining Authority for PCT/FI2013/051105 dated Dec. 3, 2014.
International Preliminary Report of Patentability for PCT/FI2013/051005 dated Feb. 23, 2015.
Search Report for FI20126270 dated Jun. 6, 2013.
Reply to International Preliminary Report on Patentability for PCT/FI2013/051105 dated Jan. 22, 2015.

* cited by examiner

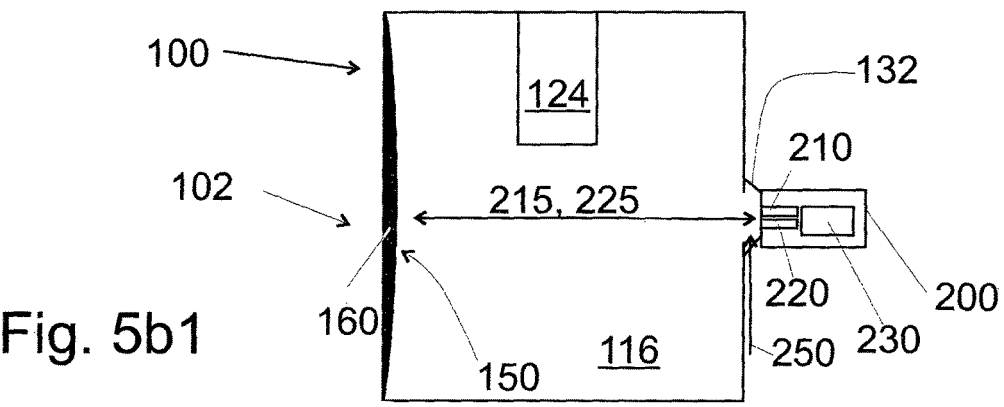
Fig. 5b1
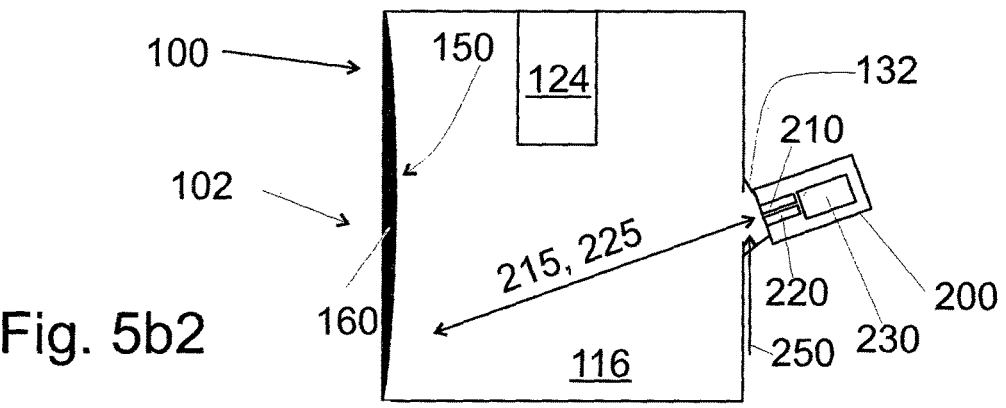
Fig. 5b2
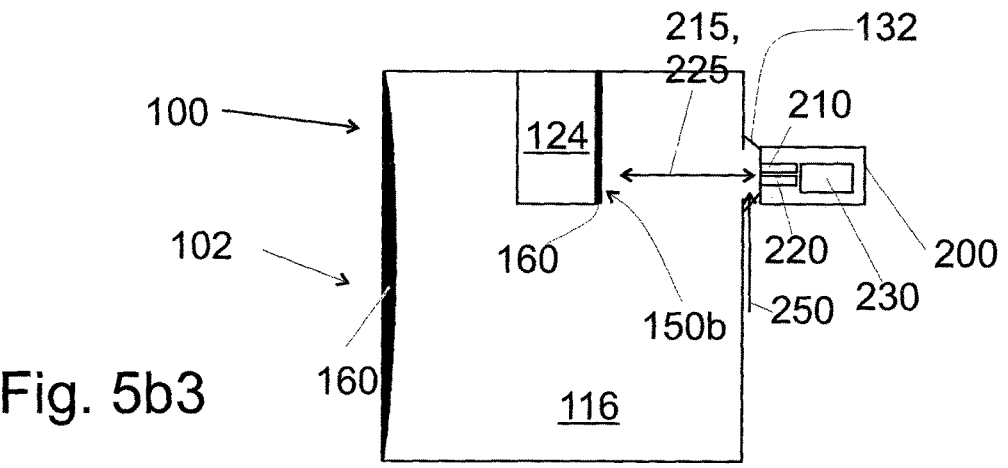
Fig. 5b3

ARRANGEMENT IN A THERMAL PROCESS, AND A METHOD FOR MEASURING THE THICKNESS OF A CONTAMINATION LAYER

CROSS REFERENCES TO RELATED APPLICATIONS

This application is a national stage application of International App. No. PCT/FI2013/051105, filed Nov. 25, 2013, and which claims priority on Finnish Application No. FI20126270, Filed Dec. 5, 2012, the disclosures of both of which applications are incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to an arrangement in a thermal device or in a thermal process. The invention also relates to a system comprising a thermal device. Furthermore, the invention relates to the use of an electromagnetic, such as optical, distance measurement instrument for taking measurements of a thermal device. Furthermore, the invention relates to a method for measuring the thickness of a contamination layer on a thermal device. Moreover, the invention relates to a method for cleaning or maintaining, for example sooting, a thermal device. Furthermore, the invention relates to optimizing the cleaning or removing soot of a thermal device.

Thermal devices are used for producing energy or fuel from combustible material. Thermal devices, such as boilers, comprise walls which define, among other things, a furnace and/or flue gas ducts. Moreover, boilers comprise heat exchangers for recovering heat formed in combustion. Both the walls and the heat exchangers comprise surfaces. During combustion of combustible material, flue gases are formed in the furnace. Part of the flue gases contaminate said surfaces. Thus, a layer of soot or ash accumulates on said surfaces. The layer of soot or ash insulates heat and thereby reduces the recovery of heat from the boiler. This is one reason why the surfaces have soot removed every once in a while.

As described above, too infrequent removing soot reduces the recovery of heat from the boiler, because a thick layer of soot or ash can thus accumulate on the heat delivery surface, and the layer insulates heat. Too frequent removing soot, in turn, wears the surfaces of the boiler and the soot removal device itself, reducing their service life. According to the state of the art, the removing soot can be performed, for example, at regular intervals.

SUMMARY OF THE INVENTION

It has been found that the thickness of a contamination layer on a surface of a thermal device can be measured during the use of the thermal device. The measurement during the use can be advantageously performed by an electromagnetic distance measurement instrument. The electromagnetic distance measurement instrument can be an optical distance measurement instrument. An arrangement according to an embodiment of the invention comprises
a thermal device comprising walls which enclose inner parts of the thermal device, and
a surface that reflects and/or scatters electromagnetic radiation in the inner part of the thermal device.

The arrangement also comprises
a source of electromagnetic radiation arranged at a first distance from said surface,
a detector of electromagnetic radiation arranged at a second distance from said surface, and
a processing unit, in which arrangement
the source of electromagnetic radiation is configured to emit radiation from the source of electromagnetic radiation to said surface, said radiation being reflected and/or scattered from said surface in the form of reflected radiation,
the detector of electromagnetic radiation is configured to receive reflected radiation,
the processing unit is configured to determine information dependent on the first and/or second distance by means of emitted radiation and reflected radiation, and
the wall of the thermal device comprises a window or an aperture for emitting an optical signal from said source of light to said surface.

The arrangement can be implemented, for example, by applying an electromagnetic distance measurement instrument, such as an optical distance measurement instrument. An embodiment of the invention is the use of an electromagnetic distance measurement instrument for measuring the thickness or an increase in the thickness of a contamination layer on a thermal device. An embodiment is said use during the operation of the thermal device.

A method according to an embodiment of the invention for measuring the thickness of a contamination layer on a thermal device comprises
emitting electromagnetic radiation from a source of electromagnetic radiation to a surface, said radiation being reflected and/or scattered from said surface in the form of reflected radiation, the source of electromagnetic radiation being arranged at a first distance from said surface;
receiving said reflected radiation by a detector of electromagnetic radiation arranged at a second distance from said surface; and
determining data dependent on the first and/or second distance by means of the emitted radiation and the reflected radiation.

In the method,
said surface is provided in the inner part of the thermal device.

Thus, said thickness or increase in the thickness of the contamination layer can be determined by means of said data.

The method or the arrangement can be utilized, for example, in optimizing the cleaning and/or maintenance of a thermal device.

BRIEF DESCRIPTION OF THE DRAWINGS

In the following, the invention will be described in more detail with reference to the appended drawings, in which:
FIG. 5b1 shows a flue gas duct of a boiler in a side view,
FIG. 5b2 shows a flue gas duct of a boiler in a side view,
FIG. 5b3 shows a flue gas duct of a boiler in a side view.

In FIGS. 1 to 8, corresponding numerals or symbols refer to corresponding parts.

DESCRIPTION OF THE PREFERRED EMBODIMENTS

Figure 1:
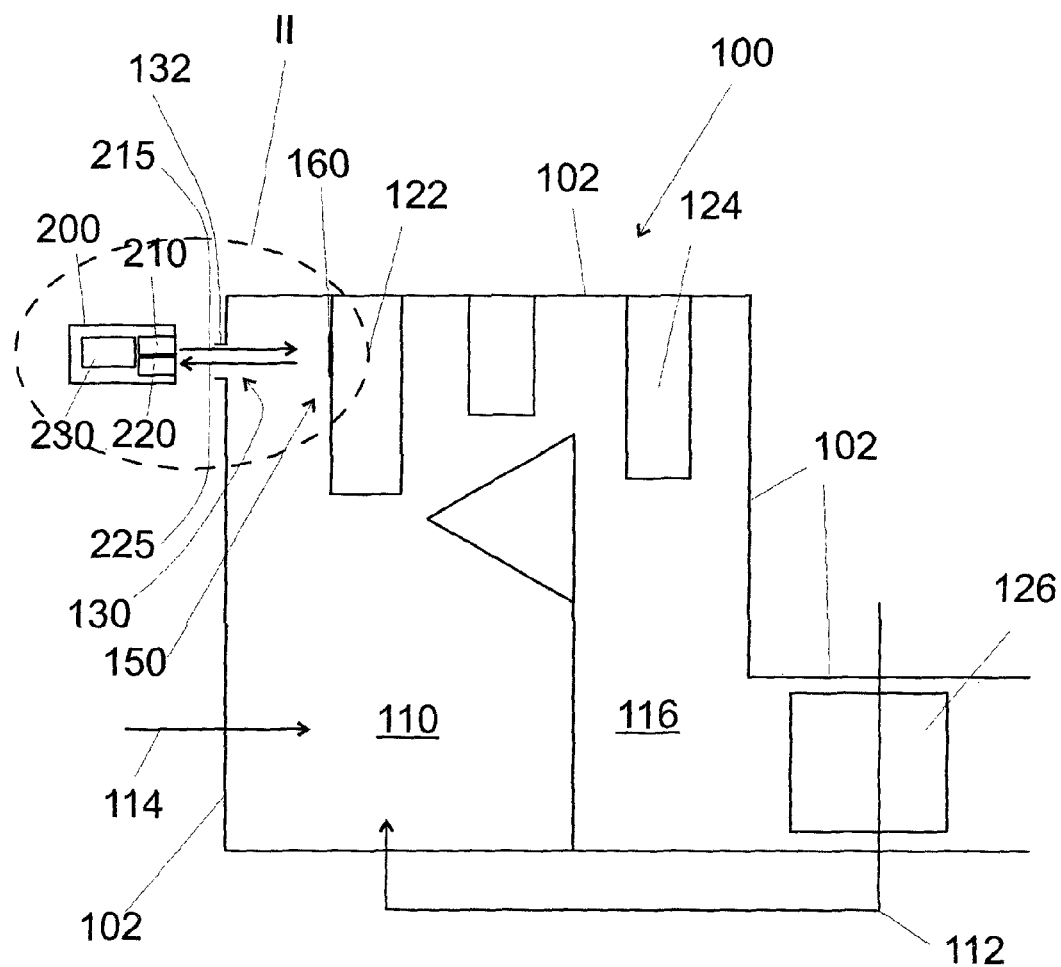
FIG. 1 shows a boiler in a side view.

FIG. 1 shows an arrangement. The arrangement comprises a thermal device 100. The thermal device refers to a device which is configured to produce energy and/or fuel, from combustible material. For example, the thermal device can refer to a boiler for burning combustible material for producing energy. Boilers can be classified according to the combustible material, wherein, for example, the following boilers are known: a soda recovery boiler (for burning black liquor), an oil-fired boiler, a coal-fired boiler, a pulverized fuel boiler, and a waste-fired boiler (in a waste-to-energy plant). Boilers can be classified according to the structure of the boiler, wherein, for example, the following boilers are known: a fluidized bed boiler, such as a circulating fluidized bed boiler (CFB) and a bubbling fluidized bed boiler (BFB), a water tube boiler, and a fire tube boiler. For example, the thermal device can refer to a gasification reactor for oxidizing combustible material for producing synthesis gas. The synthesis gas can be further refined into fuel, such as biofuel. For example, the thermal device can refer to a pyrolysis reactor for pyrolyzing combustible material for producing pyrolysis oil. Pyrolysis oil can be refined further. Finally, the thermal device may refer to a torrefaction reactor, in which combustible material is subjected to thermal treatment for evaporating water and light hydrocarbons from the combustible material. The combustible material treated in this way can be utilized as fuel in processes later on. In a corresponding manner, the thermal process refers to a process in which energy and/or fuel is produced. According to the reactors described above, the thermal process can be, for example, a combustion, gasification, pyrolysis, or torrefaction process. The combustible material mentioned above can be, for example, bio-based solid fuel, such as wood-based material.

In the thermal process, contamination is formed, such as soot and/or ash. Such contamination accumulates in the form of a contamination layer on the inner surfaces of the thermal device 100. The contamination layer reduces the heat transfer properties of the thermal device 100, because the contamination insulates heat. After the thermal device has been contaminated, it needs to be cleaned. In connection with the cleaning, other maintenance operations can be conducted as well. The cleaning can be performed, for example, by removing soot.

The cleaning of the thermal device can be optimized, if the amount of contamination on the surfaces of the thermal device is known. Optimization of the cleaning is advantageous, because one can then make sure that the heat transfer from the thermal device is good (cleaning is performed sufficiently frequently), and that the device is not excessively worn by removing soot (the cleaning is performed sufficiently infrequently).

A technical problem in optimizing the cleaning is the determination of the thickness of the contamination layer. It has been found that the thickness of the contamination layer can be determined electromagnetically, for example by means of an electromagnetic (such as optical) distance measurement instrument.

FIG. 1 shows an example of a thermal device 100. The thermal device 100 of FIG. 1 is a boiler 100. The thermal device 100 is part of an arrangement shown in FIG. 1.

The boiler 100 of FIG. 1 comprises walls 102 which enclose inner parts of the boiler. For example, a furnace 110 is provided in the inner part of the boiler. The furnace 110 can be used for burning fuel, such as bio-based fuel, coal, or oil. The fuel supply is illustrated by an arrow 114. For combustion, the furnace is also supplied with air. The air supply is illustrated by an arrow 112. As a result of the combustion in the furnace, heat is formed, such as radiation heat and heat contained in flue gases. Heat is recovered from the boiler 100 by means of a heat exchanger. The heat exchanger can be, for example, a superheater 112, an economizer 124, or a preheater 126 for combustion air. The heat exchanger can transfer heat from radiation and/or flue gases to a heat transfer medium, such as boiler circulation water or combustion air. For example, a superheater 122 and an economizer 124 are provided for transferring heat to boiler circulation water. An air preheater 126 is provided for transferring heat to combustion air. Other thermal devices comprise walls and may comprise heat exchangers as well.

Said inner parts of the boiler 100 are delimited by surfaces 150. In this context, the surface 150 refers to any surface that delimits a space in which a thermal process, such as combustion, takes place. The surface 150 may also refer to a surface downstream of the actual processes, such as a flue gas duct. The surface may be, for example, the surface of a wall, such as a wall 102 in the inner part of the boiler. The surface 150 may be, for example, the surface of a furnace 110 or a flue gas duct 116. The surface 150 may be, for example, the surface of a heat exchanger. The surface 150 may be, for example, the surface of a superheater 122, an economizer 124, or an air preheater 126. During combustion of combustible material, flue gases are formed in the furnace 110. Part of the flue gases contaminate the surfaces 150 of the boiler. Thus, a contamination layer 160 is formed on said surfaces 150. The contamination layer 160 insulates heat and thereby reduces the recovery of heat from the boiler 100. When a contamination layer 160 is formed on a clean surface, the surface 150 delimiting the boiler is the surface 150 of said contamination layer. Thus, the actual contamination layer 160 is left under the surface 150. The contamination layer 160 may comprise, for example, at least one of the following: soot and ash.

It has been found that the thickness of the contamination layer 160 can be measured electromagnetically. In particular, it has been found that the thickness of the contamination layer 160 can be measured optically. The arrangement of FIG. 1 comprises a source 210 of electromagnetic radiation. In an embodiment, a light source 210 is used as the source of electromagnetic radiation. The source 210 is arranged at a first distance $L_1$ (FIGS. 2 and 4) from the surface 150. The source 210 is configured to emit radiation 215 from the light source 210 to the surface 150. The source 210 is configured to emit radiation 215 at a first moment of time $t_1$. When the radiation 215 hits the surface 150, for example the surface of the contamination layer 160, at least part of the radiation 215 is reflected and/or scattered in the form of reflected radiation 225. Radiation can also be diffracted back, which is considered scattering in this context. Radiation is reflected and/or scattered from at least one point of reflection. Reflected radiation, such as reflected light, is indicated with the reference numeral 225 in FIG. 1. In this context, scattering refers to the scattering or the diffraction of the radiation 215 at random angles or at an angle different from the angle of incidence. Thus, the angle of incidence of the radiation 215 is not necessarily equal to the scattering angle of the radiation 225. Reflection of the radiation 215 by a plane surface 150, in turn, takes place in such a direction that the angle of incidence of the radiation 215 is equal to the angle of reflection of the radiation 255. The surface 150 may be uneven in microscale, which causes scattering; in other words, the radiation 215 is reflected in several directions due to the roughness of the surface 150, which is seen as scattering. As shown in FIG. 1, the source 210 of radiation is, in an embodiment, arranged outside the thermal device 100.

In the arrangement, the surface 150 reflects radiation (such as light). In particular, the surface 150 reflects radiation at such a wavelength that is emitted by the source 210 of light. The reflection coefficient of the surface 150 does not need to be high. The reflection coefficient of the surface 150 at a radiation wavelength emitted by the source 210 can be at least 0.001, at least 0.01 or at least 0.1. It is also possible that the reflection coefficient is higher, for example at least 0.5. As will be presented below, the wavelength emitted by the source 210 can also be selected in such a way that the reflection coefficient of the contamination layer 160 is sufficient precisely at this wavelength.

The arrangement of FIG. 1 comprises a detector 220 of electromagnetic radiation. In an embodiment, the detector 220 used for electromagnetic radiation is a light detector 220. The detector 220 is arranged at a second distance $L_2$ (FIGS. 2 and 4) from said surface 150. In FIG. 1, the first and second distances are equal. The light detector 220 is configured to receive electromagnetic radiation, such as reflected radiation 225. The detector 220 is configured to receive reflected radiation 225 at a second moment of time $t_2$. Depending on the method of measurement, the second moment of time $t_2$ may be the same as the first moment of time $t_1$. Various methods of measurement will be presented below. As shown in FIG. 1, the detector 220 of radiation is, in an embodiment, arranged outside the thermal device 100.

The arrangement of FIG. 1 comprises a processing unit 230. The processing unit is configured to determine information dependent on the first and/or second distance by means of emitted radiation 215 and reflected radiation 225. For example, the processing unit 230 can be configured to determine the second moment of time $t_2$ and the first moment of time $t_1$. The processing unit 230 can be configured to determine the thickness of the contamination layer 160 by utilizing said information depending on the first and/or the second distance. As shown in FIG. 1, the processing unit 230 is, in an embodiment, arranged outside the thermal device 100.

The processing unit 230 can be configured to transmit said information depending on the first and/or the second distance. This information will be discussed in more detail below, in connection with different measurement methods.

In FIG. 1, the wall 102 of the boiler 100 comprises an aperture 130 for transmitting an electromagnetic signal 215 from the source 210 to the surface 150. Instead of or in addition to the aperture, the wall 102 may comprise a window for transmitting the electromagnetic signal 215 from the source 210 to the surface 150. Via the aperture 130, it is also possible to supply protective gas 250 (FIG. 2), such as air or other gas, to the boiler 100, in order to keep the source 210 and/or the detector 220 clean. The supply of air can be intensified by means of a pipe 132. This part is illustrated in more detail in FIG. 2.

FIG. 1 also shows an electromagnetic distance measurement instrument 200 which comprises a radiation source 210, a radiation detector 220, and a processing unit 230. The distance measurement instrument may constitute a separate unit in the arrangement. Alternatively, the first and/or second distance can be measured by means of separate components, that is, by a separate source 210, a separate detector 220, and a separate processing unit 230. Advantageously, an optical distance measurement instrument 200 is used as the electromagnetic distance measurement instrument 200. As shown in FIG. 1, the distance measurement instrument 200 is, in an embodiment, arranged outside the thermal device 100. This gives the advantage that the distance measurement instrument can be used during the operation of the thermal device. Typically, the conditions prevailing inside the thermal device are such that the measurement instrument does not resist such an operating environment.

Figure 2:
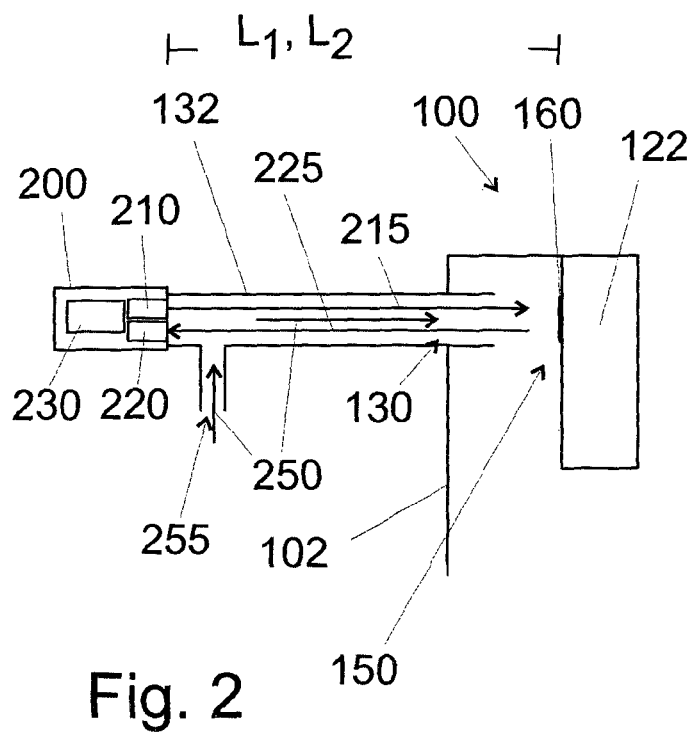
FIG. 2 shows section II of FIG. 1 in more detail.

FIG. 2 shows a more detailed view of the passage of protective gas 250, such as air, and radiation (215, 225), such as light, in the pipe 132. FIG. 2 shows the part II of FIG. 1 in more detail. The pipe 132 is configured such that the electromagnetic signal 215 is configured to pass through the pipe 132 from said source 210 to said surface 150. Furthermore, the arrangement of FIG. 2 comprises means for supplying protective gas 250 to said pipe 132. In FIG. 2, protective gas 250 is supplied via a protective gas inlet 255 to the pipe 132. The pipe 132 is configured to convey protective gas 250 to the boiler 100. The source 210 is configured to emit radiation 215 from the source 210 along the pipe 132 to the surface 150. The arrangement may comprise a second pipe for guiding reflected radiation 225 to the detector 220. In FIG. 2, however, the pipe 132 is configured such that the detector 220 is configured to receive reflected radiation 225 via the pipe 132.

As shown in FIG. 2, in an embodiment the pipe 132 extends from the wall 102 of the boiler 100 inwards, towards the inner parts of the boiler 100. Furthermore, in an embodiment the pipe 132 extends from the wall 102 of the boiler 100 outwards, away from the wall 102 of the boiler and the from the inner parts of the boiler. In an embodiment, the pipe 132 only extends outwards from the wall 102 of the boiler 100. In an embodiment, the pipe 132 only extends inwards from the wall 102 of the boiler 100.

Advantageously, the source 210 is arranged at a third distance from the detector 220 in such a way that the third distance is short. The third distance can be, for example, shorter than 10 cm, shorter than 5 cm, or shorter than 1 cm. When the detector is close to the source, the direction from the source 210 to the surface 150 is opposite or almost opposite to the direction from the surface 150 to the detector 220. Thus, as the contamination layer 160 increases, both the first distance $L_1$ (the distance from the source 210 to the surface 150) and the second distance $L_2$ (the distance from the surface 150 to the detector 220) decrease. It is thus possible to measure both distances at a single measurement time, and the accuracy of measurement is improved. Preferably, the angle between a first direction from the source 210 to the reflection point of the surface 150, and a second direction from the detector 220 to said reflection point, is smaller than 5 degrees, more preferably smaller than 1 degree. This kind of a situation is shown in FIG. 2.

FIGS. 3a to 3e show some electromagnetic methods for measuring a distance. By measuring the distance, it is possible to determine the thickness of the contamination layer 160. As described above, when the thickness of the layer 160 increases, the first distance $L_1$ between the surface 150 and the source 210, and/or the second distance $L_2$ between the surface 150 and the detector 220 decreases.

Figure 3A:
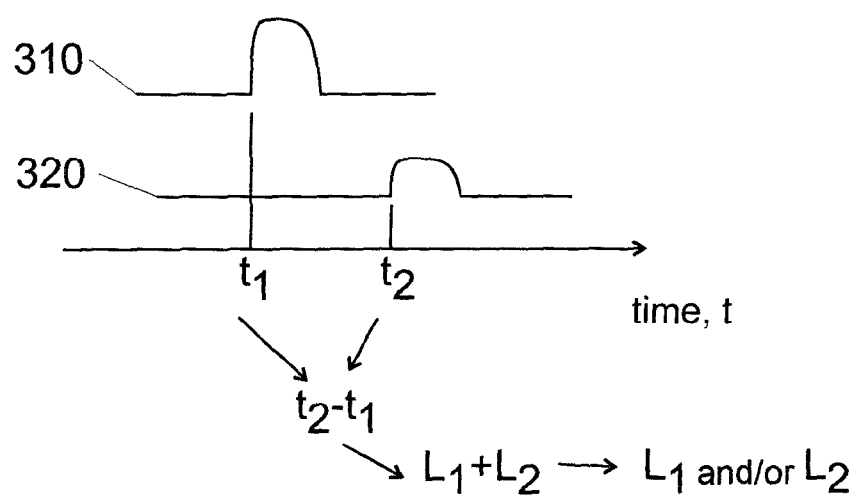
FIG. 3a shows a signal at a light source and a signal at a light detector as a function of time.

FIG. 3a shows a principle of distance measurement when the device corresponds, for example, to the device shown in FIG. 2. The method according to FIG. 3a is based on the time taken by the propagation of electromagnetic radiation. In the upper part of FIG. 3a, a signal 310 at a light source 210 (or more generally, at a radiation source 210) is shown as a function of time. The signal 310 may refer to a control signal of the light source 210, such as a voltage or a current, or it may refer to the intensity of emitted light 215. The moment of signal rise is said first moment of time $t_1$. Alternatively or in addition, other moments relating to the signal 310 can also be used for determining the first moment of time $t_1$.

In the lower part of the figure, a signal 320 at a light detector 220 (or more generally, at a radiation detector 220) is shown as a function of time. The signal 320 may refer to a signal obtained from the light detector 220, such as a voltage or a current, or it may refer to the intensity of reflected light 225. The moment of signal rise is said second moment of time $t_2$. Alternatively or in addition, other moments relating to the signal 320 can also be used for determining the second moment of time $t_2$.

As known, light propagates in a medium at the speed c, where $c=c_0/n$, $c_0$ is the speed of light in a vacuum, 299,792, 458 m/s, and n is the refractive index of the medium. The refractive index of the protective gas 250, such as air, is very close to the value of 1. For example, the refractive index of air is about 1.0003. For many dense substances, such as liquids and solids, the refractive index may be higher, for example 1.2 to 2.5.

When the first and second moments of time, $t_1$ and $t_2$, are known, the distance traveled by light can be calculated as $L_1+L_2=c\times(t_2-t_1)$, where $L_1$ is the distance of the light source from the reflection point of the surface 150, i.e. the first distance, and $L_2$ is the distance between the reflection point and the light detector, i.e. the second distance. As mentioned above, the light source 210 is arranged at a third distance $L_3$ from the light detector. Advantageously, the third distance is small in relation to the distance to be measured. For example, in an arrangement, the distances are selected so that $L_3<0.1\times\min(L_1,L_2)$, more advantageously $L_3<0.05\times\min(L_1,L_2)$, and more preferably $L_3<0.02\times\min(L_1,L_2)$. Thus, irrespective of the mutual location of the light source 210 and the light detector 220, with a relatively good accuracy $L_1=L_2=0.5\times c\times(t_2-t_1)$. If the signal 310 refers to the control signal of the source 210, and the signal 320 refers to the electric signal given by the detector 220, part of the time may be taken by the response lag of the source and the detector. Such a time can be taken into account in determining the distance, for example by calibration.

When a contamination layer 160 accumulates on the surface 150, the first distance $L_1$ and/or the second distance $L_2$ is reduced. On the basis of this, the thickness of the contamination layer 160 can be determined. In the case of FIG. 2, both the distances $L_1$ and $L_2$ are reduced to an equal extent.

Figure 3B:
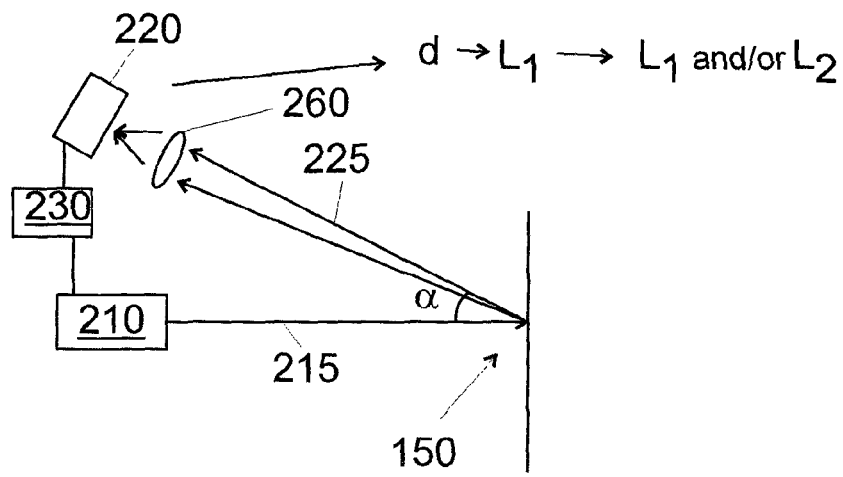
FIG. 3b shows a method for measuring a distance.

FIG. 3b illustrates a method for electromagnetic distance measurement based on triangulation. A signal 215 is emitted by the radiation source 210 and reflected and/or scattered by the surface 150. A radiation detector 220 is arranged at a third distance from the radiation source. Consequently, the radiation received by the detector 220 has been reflected and/or scattered by the surface 150 at an angle α. Obviously, the angle α depends on the first distance, because the distance between the detector 220 and the source 210 is constant. Scattered and/or reflected radiation can be collected at the detector 220, for example by a lens 260. Furthermore, as shown in the figure, the location d of the signal 225 on the detector 220 will depend on the angle α. The location of the signal can refer to the location of the maximum intensity of the reflected radiation 225 collected by the lens 260. When the location d of the signal on the detector 220 is known, it is possible to solve the first distance $L_1$. Alternatively, by means of the location d, it is possible to determine the angle α, by means of which it is further possible to solve the first distance $L_1$. When the first distance $L_1$ changes, the change can be interpreted to be due to, for example, an increase in the contamination layer 160. Alternatively, it is possible to know the distance of the clean surface from the radiation source, and a reduction in this distance is an indication of the thickness of the contamination layer 160.

Figure 3C:
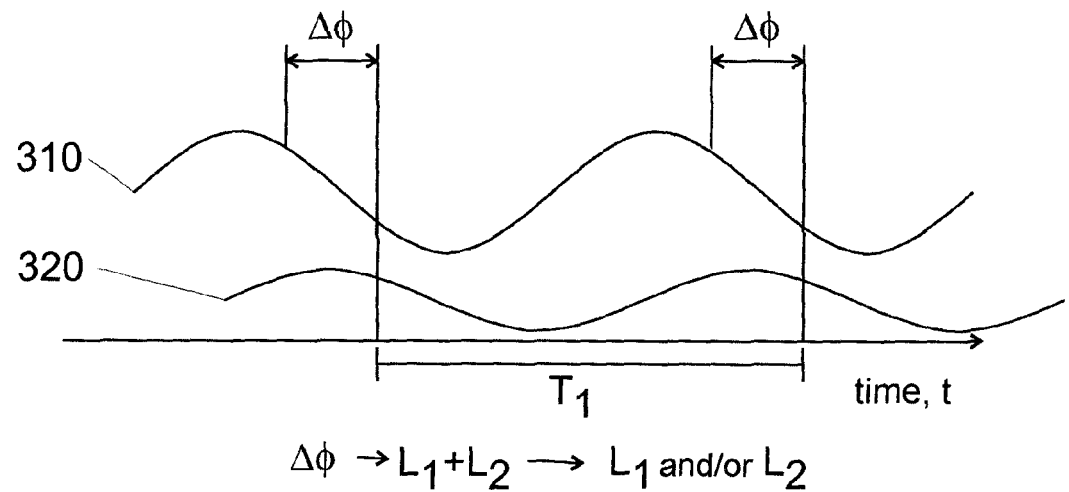
FIG. 3c shows a signal at a light source and a signal at a light detector as a function of time, as well as a method for measuring a distance.

FIG. 3c illustrates a principle of distance measurement when the device corresponds, for example, to the device shown in FIG. 2. FIG. 3c shows a signal 310 at a light source 210 as a function of time. The figure also shows the signal 320 at a light detector 220 as a function of time. The term signal has been discussed above in connection with FIG. 3a. During a period of time $T_1$ when reflected radiation 225 is received by the detector 220, the received signal is measured. In particular, the shape of the received signal 320 is measured. The shape of the measured signal 320 is compared with the shape of the emitted signal 310. From this, the phase difference Δϕ between the signals 310 and 320 can be concluded. When the phase difference and the cycle time T of the signal shape are known, the time difference can be concluded as $(\Delta\phi)/2\pi\times T$, and the first and/or the second distance can be concluded from said time difference. If the cycle time of the signal is short and the first or the second distance is long, the phase difference may be greater than an entire phase. Thus, it is also possible to use information obtained from the time difference for determining the integer multiple of the phase difference. According to FIG. 3b, part of the phase difference can be concluded by comparing the shapes of the signals.

The accuracy of the methods shown in FIGS. 3a to 3c is typically sufficient for determining the thickness of the contamination layer 160.

Figure 3D:
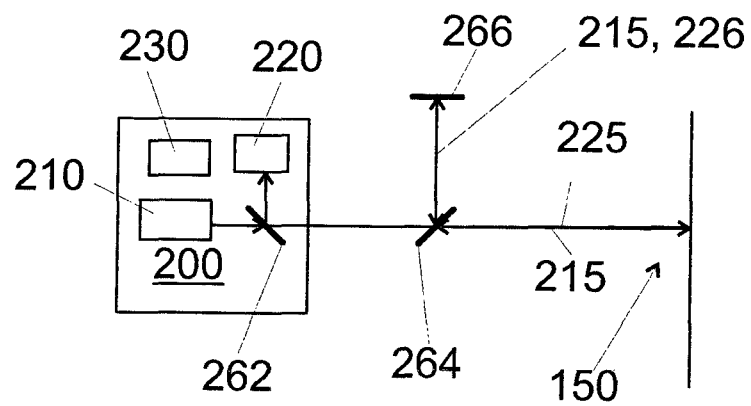
FIG. 3d shows a method for measuring a distance.

FIG. 3d shows a method based on interference. In the method, a laser source 210 is used. Emitted radiation 215 is guided by a first one-way mirror 262 and a one-way mirror 264 to the surface 150. From the surface 150, radiation 215 is reflected in the form of reflected radiation 225. Part of the emitted radiation 215 is reflected by said one-way mirror 264 to a reflecting surface 266 used as a distance reference. The radiation 215 received at the reflecting surface is reflected in the form of reflected reference radiation 226. The reflected radiation 225 and the reflected reference radiation 226 are guided to the radiation detector 220. The reflected radiation 225 and the reflected reference radiation 226 interfere, and the difference in the travel distance affects the interference. By means of the interference, it is possible to conclude the distance of the radiation source 210 from the surface 150. As a phenomenon, interference can produce similar measurements if the distance is changed by a multiple of the wavelength of the radiation used. Other presented methods can also be applied for determining the rough magnitude of the first distance. If necessary, the results can be specified by interference measurements.

Figure 3E:
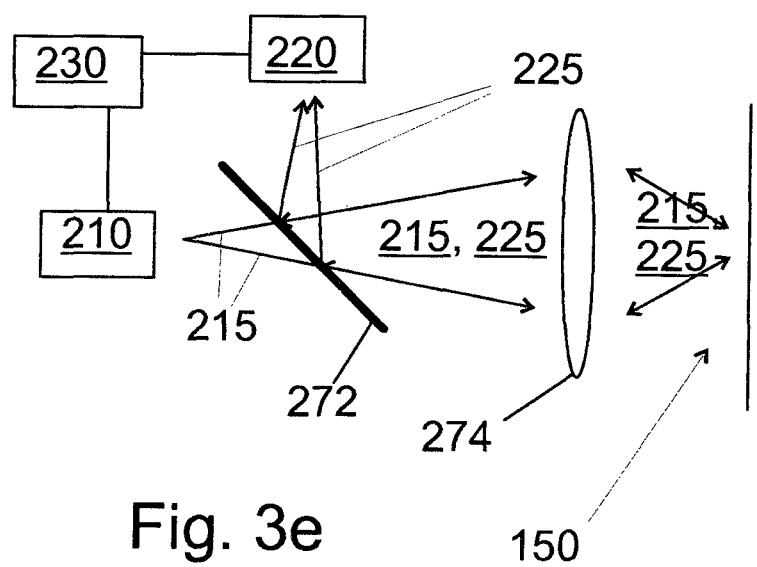
FIG. 3e shows a method for measuring a distance.

FIG. 3e illustrates yet another principle of electromagnetic distance measurement. In this method, the radiation source 210 emits broadband electromagnetic radiation 215, such as white light. The radiation 215 is guided through a one-way mirror 272. The radiation 215 is directed to the surface 150 by means of a lens 274. Because beams of different wavelengths are refracted by the lens 274 in different ways, the image of the radiation 215 on the surface 150 is focused at a given wavelength only. The wavelength, at which the image is focused, will depend on not only the wavelength but also the first distance between the light source 215 and the surface 150. From the surface 150, radiation 215 is reflected in the form of reflected radiation 225 which is guided by the lens 274 and the one-way mirror 272 to the radiation detector 220. Conclusions on the first distance can be drawn from the spectrum of the radiation. Other methods can be used in addition.

The accuracy of methods utilizing the wavelength (FIGS. 3d and 3e) is typically in the order of the wavelength; for example, for light, shorter than 800 nm. Such a high measurement precision is not often needed for the thickness of the contamination layer 160.

The presented methods comprise emitting electromagnetic radiation 215 from the source 210 of electromagnetic radiation to the surface 150, said radiation 215 being reflected and/or scattered in the form of reflected radiation 225 from said surface 150, the source 210 of electromagnetic radiation being arranged at a first distance $L_1$ from the surface 150;

receiving said reflected radiation 225 by a detector 220 of electromagnetic radiation, the detector 220 of electromagnetic radiation being arranged at a second distance $L_2$ from said surface 150; and forming data dependent on the first and/or second distance by means of the emitted radiation (215) and the reflected radiation (225).

Preferably, said data dependent on the first and/or second distance comprises at least one of the following:

a first moment of time $t_1$ and a second moment of time $t_2$ (FIG. 3a), the time difference $t_2-t_1$ between the first moment of time $t_1$ and a second moment of time $t_2$ (FIG. 3a), the location d of the radiation maximum at the detector 220 (FIG. 3b), the angle α of scattered radiation 225 (FIG. 3b), the phase difference Δφ between the measured signal 320 and the emitted signal 310 (FIG. 3c), the first distance $L_1$ between the source 210 and the surface 150 (FIGS. 3a to 3e), the second distance $L_2$ between the source 150 and the detector 220 (FIGS. 3a to 3e), and the total distance $L_1+L_2$ propagated by the light, or a part of it, such as a half, i.e. $(L_1+L_2)/2$ (FIGS. 3a to 3e).

Alternatively or in addition, said data dependent on the first and/or second distance may comprise at least one of the following:

signal intensity, when the signal interferes with a reference signal (FIG. 3d), and the spectrum of the reflected radiation 225 (FIG. 3e).

Moreover, in an embodiment, said data dependent on the first and/or second distance is such by nature that said data can be used to solve at least one of the following: the first distance $L_1$, the second distance $L_2$, and the sum of the first and the second distance $L_1+L_2$.

Figure 4:
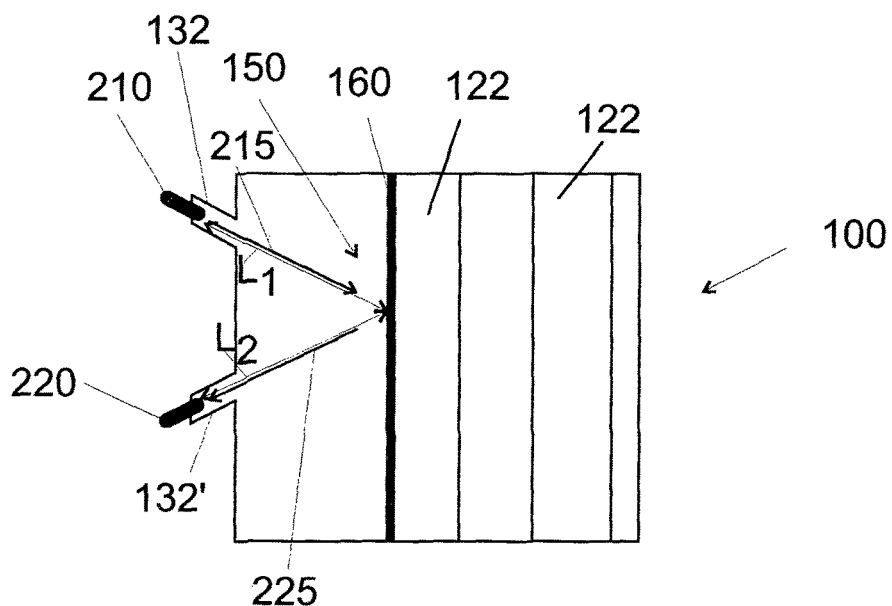
FIG. 4 shows a boiler in a top view.

FIG. 4 shows an arrangement in a top view. The arrangement comprises a thermal device 100 which comprises a surface 150. The surface 150 is the surface of a contamination layer 160. The arrangement comprises a light source 210 (or more generally, a source 210 of electromagnetic radiation). The light source 210 is configured to emit light 215 from the light source 210 to the surface 150, said light 215 being reflected from said surface 150. The reflected light is indicated with the reference numeral 225. The arrangement also comprises a first pipe 132, along which light 215 is emitted to the surface 150. Via the pipe 132, protective gas 250 can be supplied, as presented above. The light source 210 is arranged at a first distance $L_1$ from the surface 150.

The arrangement of FIG. 4 comprises a light detector 220 (or more generally, a detector 210 of electromagnetic radiation). The light detector 220 is configured to receive reflected light 225. The arrangement also comprises a second pipe 132', via which reflected light 225 propagates from the surface 150 to the light detector 220. Protective gas 250 can also be supplied via the pipe 132', as presented above. The light detector 220 is arranged at a second distance $L_2$ from the surface 150.

FIGS. 1, 2 and 4 illustrate the measurement of the distance of the surface 150, when the surface 150 is the clean surface of a heat exchanger, or the surface of a contamination layer 160 accumulated on the heat exchanger. In the figures, the heat exchanger is a superheater 122.

Figure 5A:
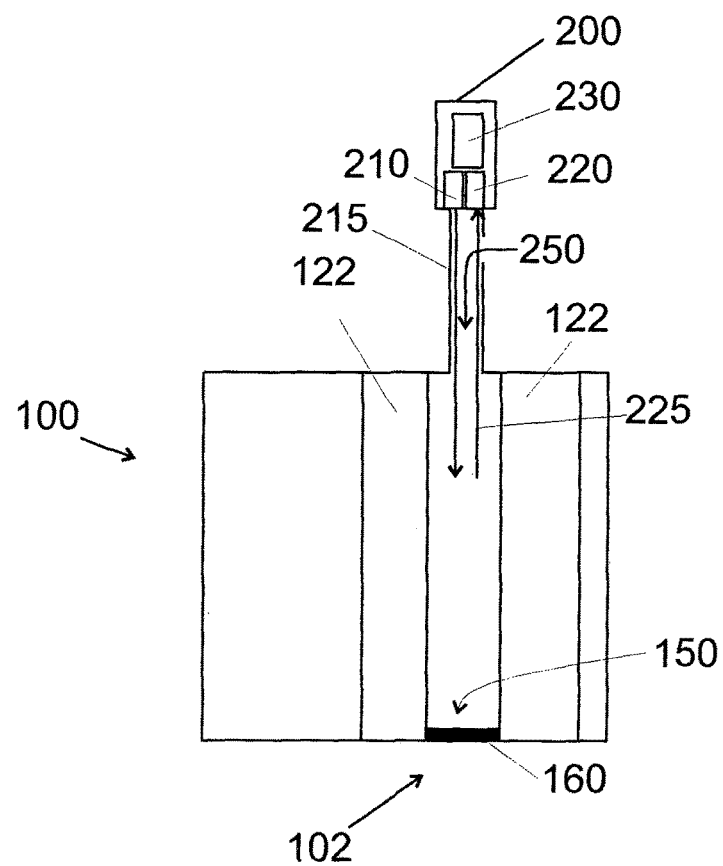
FIG. 5a shows a boiler in a top view.

FIG. 5a illustrates the measurement of the distance of the surface 150 when the surface 150 is the clean surface of a wall 102 of a boiler 100, or the surface of a contamination layer 160 accumulated on the wall 102 of the boiler 100. In FIG. 5a, the light detector 220 and the light source 210 are arranged close to each other. In FIG. 5a, the light detector 220 and the light source 210 are arranged in an optical distance measurement instrument 200.

The radiation source 210 is preferably a light source. The radiation source 210 is preferably a laser source (Light Amplification by Stimulated Emission of Radiation). The laser source is configured to emit light by stimulated emission. Such light is monochromatic or substantially monochromatic. The bandwidth of the light source can be, for example, less than 1 nm. Such light is also coherent or substantially coherent. Coherent light is hardly broadened during its propagation, but it propagates in the form of a dense beam. Coherent light has the technical advantage that it hardly loses any of its intensity as a result of broadening when travelling from the light source 210 to the surface 150.

The radiation source 210 is preferably configured to emit electromagnetic radiation having a wavelength of at least 300 nm. If the wavelength is very short, it has been found that the radiation does not propagate under boiler conditions, because gases typically prevailing in the boiler 100 absorb radiation. It has been found that light having a wavelength of at least 300 nm still propagates relatively well in the boiler. More preferably, the wavelength is at least 400 nm or at least 450 nm. Furthermore, the temperature in the boiler is typically relatively high, for example 150° C. to 600° C. in some parts of the flue gas duct, 600° C. to 900° C. in superheaters or in their vicinity, and about 900° C. to 1100° C. in the gases of the furnace. A lot of background radiation is present in hot conditions, because the hot environment radiates according to its temperature, following the radiation of a black body, possibly corrected with the emissivity of the surfaces. In hot conditions, the quantity of background radiation not only increases but also shifts towards shorter wavelengths according to Planck's law of radiation. Moreover, it has been found that the wavelength to be used in boiler conditions is preferably shorter than 800 nm. More preferably, the wavelength is shorter than 750 nm or shorter than 700 nm. For example, green light can be used as the radiation, e.g. green laser light. As the radiation source 210, it is possible to use, for example, a semiconductor laser configured to emit green light. Thus, the wavelength can be for example 490 nm to 560 nm, or for example 510 nm to 550 nm, or for example 515 nm to 540 nm. An excellent price/efficiency ratio can be achieved, for example, by a semiconductor laser source configured to emit light having a wavelength of about 520 nm (for example, 516 nm to 524 nm). Consequently, the wavelength can be, for example, in a range from one of said lower limits to one of said upper limits, such as from 300 nm to 800 nm, or from 400 nm to 700 nm.

Moreover, the wavelength of the light 215 emitted by the light source 210 can be selected so that the reflection coefficient of the contamination layer 160 at this wavelength is sufficient in view of the measurements. The reflection coefficient is slightly better at long wavelengths than at short wavelengths. Consequently, the wavelength can be, for example, 400 nm to 800 nm.

In an embodiment, the detector 220 is configured to receive light having the same wavelength as the radiation emitted by the source 210. For example, the wavelength of the radiation to be received can be within the above described limits. The light detector 220 is configured to receive light having said wavelength, for example in such a way that the light detector 220 gives an electrical signal, such as a voltage or a current, when the light detector 220 is hit by light having said wavelength.

After data depending on the first and/or second distance has been determined in any of the above presented ways by means of the emitted radiation 215 and the reflected radiation 225, it is possible to determine the thickness of the contamination layer 160. For example, it is possible to determine the first distance $L_1$ and/or the second distance $L_2$, and to use at least either of the distances for determining the thickness of the contamination layer. For example, it is possible to know the distance between the light source 210 and the clean surface. By measuring, it is possible to find out the distance between the light source 210 and the surface 150. Said distance is, by the thickness of the contamination layer 160, shorter than the distance between the light source 210 and the clean surface. Alternatively, it is possible to measure optically, by any of the above described ways, first the distance between the light source 210 and the clean surface, and later, by any of the above described ways, the distance between the light source 210 and the surface 150. From the difference in the distances, it is possible to conclude the thickness of the contamination layer 160.

In an embodiment, a processing unit 230 is configured to determine the thickness of the contamination layer 160 on said surface 150. More precisely, in an embodiment, the processing unit 230 is configured to determine the thickness of the contamination layer 160 under said surface 150. Said surface 150 will reflect light, on the basis of which the distance is determined, and the surface 150 is the surface of the contamination layer 160 to be measured. If the surface of the boiler is clean, the surface 150 can be the clean surface of the wall of the boiler or of the heat exchanger.

With reference to FIGS. 5b1 to 5b3, in an arrangement, the source 210 of electromagnetic radiation is configured to be movable with respect to the surface 150. In an arrangement, the source 210 of electromagnetic radiation is configured to be movable and turnable with respect to the surface 150. In an arrangement, the source 210 of electromagnetic radiation is configured to be turnable with respect to the thermal device 100. The advantage of the moving and/or turning is that the same device can be used for measuring the thickness of the contamination layer 160 or an increase in the thickness at several points of the surface 150. Alternatively and/or in addition, it is possible to measure the thickness of the contamination layer, or an increase in the thickness, on several different surfaces. With respect to moving, the technical advantage of turning is that the same pipe 132, or the same aperture 130 in the wall 102 (FIG. 1), to which aperture the pipe 132 is connected, can be utilized for measuring the thickness of the contamination layer at several different points and/or on several different surfaces, as shown in FIGS. 5b1 and 5b2.

FIGS. 5b1 to 5b3 show an arrangement in which the source 210 of electromagnetic radiation is configured to be movable and turnable in relation to the surface 150. In FIG. 5b1, the distance measurement instrument 200 is configured to measure the distance from the radiation source 210 to a first point on the surface 150. Said first point in FIG. 5b1 is on the opposite side of the flue gas duct 116 with respect to the distance measurement instrument 200. In FIG. 5b1, said first point is substantially in the centre of the wall 102 of the flue gas duct 116. Furthermore, the direction of propagation of the emitted radiation 215 and the reflected radiation 225 is substantially transverse to the surface 150 at said first point. In FIG. 5b1, the distance measurement instrument 200, particularly the radiation source 210, is arranged at a first angle to the surface 150. In FIG. 5b1, the distance measurement instrument 200, particularly the radiation source 210, is arranged in a first location with respect to the thermal device 100.

In FIG. 5b2, the distance measurement instrument 200 is configured to measure the distance from the radiation source 210 to a second point on the surface 150. Said second point in FIG. 5b2 is on the opposite side of the flue gas duct 116 with respect to the distance measurement instrument 200. In FIG. 5b2, said second point is at the edge of the wall 102 of the flue gas duct 116. The directions of propagation of the emitted radiation 215 and the reflected radiation 225 form an angle to the surface 150, the angle deviating from the right angle. In FIG. 5b2, the distance measurement instrument 200, particularly the radiation source 210, is arranged at a second angle to the surface 150. The second angle is different from the first angle. In FIG. 5b1, the distance measurement instrument 200, particularly the radiation source 210, is arranged in said first location with respect to the thermal device 100. It is obvious that alternatively, the thickness of the contamination layer 160 at the second point of the surface 150 could be measured by just moving the distance measurement instrument 200 (cf. FIG. 5b3).

In FIG. 5b3, the distance measurement instrument 200 is configured to measure the distance from the radiation source 210 to a first point on a second surface 150b. Said second surface is the surface of a heat exchanger 124. In FIG. 5b3, the distance measurement instrument 200, particularly the radiation source 210, is arranged at a first angle to the surface 150. In FIG. 5b3, the distance measurement instrument 200, particularly the radiation source 210, is arranged in a second location with respect to the thermal device 100. The second location is different from the first location. It is obvious that the thickness of the contamination layer 160 on the surface of the heat exchanger 124 could be measured by just turning the distance measurement instrument 200 (cf. FIG. 5b2). The arrangement of FIG. 5b3 can comprise, for example, a openable and closable lid in the wall 102 of the thermal device 100. The lid can be opened for transmitting optical signals 215, 225 from the distance measurement instrument 200 to the first 150 or second surface 150b. The lid can be closed when a distance is measured with the distance measurement instrument placed in another location. In an embodiment, the lid is configured to close an aperture 130 (FIG. 1).

For example, by the arrangement shown in FIG. 5b2, the whole surface 150 can be scanned by changing the angle between the radiation source 210 and the surface 150. In this way, it is possible to measure the thickness of the contamination layer 160, or an increase in the thickness, at several points of the surface 150. Thus, the thickness of the contamination layer 160, or an increase in the thickness, can be measured on the whole surface 150.

In the above-described way, data on the thickness of the contamination layer 160, measured during the operation of the thermal device, can be utilized, for example, in the optimization of the cleaning of the thermal device. Thus, the arrangement can comprise a cleaning device 360, such as a soot removal device 360.

Figure 6:
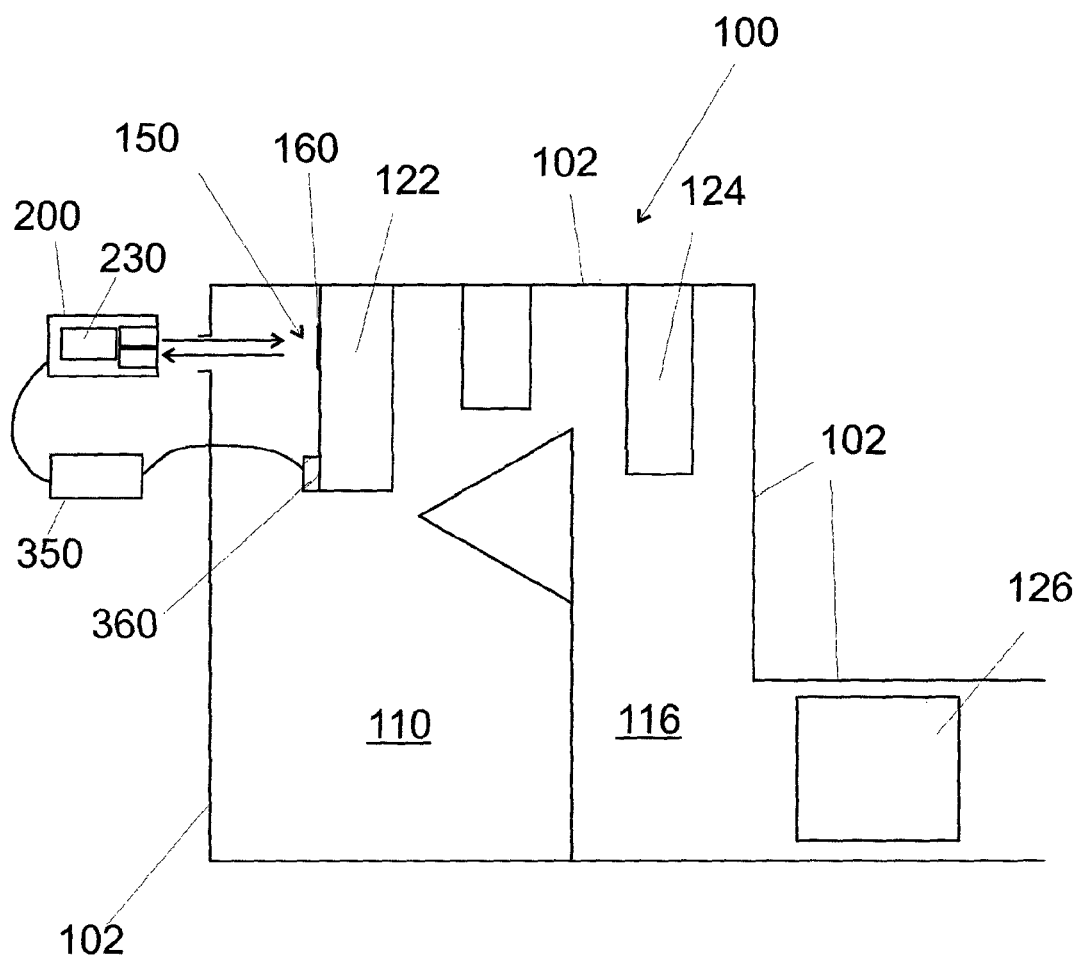
FIG. 6 shows a boiler in a side view.

Referring to FIG. 6, the arrangement can be, for example, part of a boiler system. Such a boiler system comprises any of the arrangements described above. Furthermore, the boiler system comprises
- a soot removal device 360 for removing soot a surface of the boiler, and
- a control device 350 for controlling said soot removal device 360.

In the boiler system of FIG. 6, the processing unit 230 is configured to transmit said data depending on the first and/or second distance to said control device 350. The data to be transmitted can be any of the above described data, or data formed of these. The data can be, for example, encoded for the transmission.

The control device 350 is configured to receive said data. Furthermore, the control device 350 is configured to control the soot removal device 360 by means of said data. In an embodiment, the processing unit 230 and the controller 350 is integrated as a single entity, for example in the processing unit 230. Thus, the processing unit 230 is configured to control said cleaning device 360. In an embodiment, the processing unit 230 is configured to control said cleaning device 360 by means of said data depending on the first and/or the second distance.

The soot removal device 360 is arranged in the thermal system for removing soot a surface of the thermal device. In an embodiment, the soot removal device 360 is arranged in the thermal system for removing soot said surface 150 of the thermal device.

More generally, the cleaning device 360 is arranged in the thermal system for cleaning a surface of the thermal device 100, for example by washing. In an embodiment, the cleaning device 360 is arranged in the thermal system for removing soot said surface 150 of the thermal device 100.

As presented above, an electromagnetic distance measurement instrument 200 can be used for measuring the thickness of the contamination layer 160. Such an electromagnetic distance measurement instrument 200 comprises a source 210 of electromagnetic radiation, a detector 220 of electromagnetic radiation, and a processing unit 230. In particular, the electromagnetic distance measurement device 200 can be used for measuring the thickness of the contamination layer 160 during the operation of the thermal device, for example during the operation of a boiler. During the operation of the thermal device, energy and/or second fuel is produced by using first fuel. The first fuel may comprise solid bio-based material, such as wood. The second fuel can comprise gaseous or liquid fuel. For example, during the operation of a boiler, fuel is burnt inside the boiler. In addition or alternatively, the electromagnetic distance measurement instrument 200 can be used for measuring an increase in the thickness of the contamination layer 160.

As presented above, an optical distance measurement instrument 200 can be used for measuring the thickness of the contamination layer 160. Such an optical distance measurement instrument 200 comprises a light source 210, a light detector 220, and a processing unit 230. In particular, the optical distance measurement instrument 200 can be used for measuring the thickness of the contamination layer 160 during the operation of the thermal device. In addition or alternatively, the optical distance measurement instrument 200 can be used for measuring an increase in the thickness of the contamination layer 160.

The electromagnetic, such as optical, distance measurement instrument can also be used for optimizing the maintenance or cleaning of the thermal device. By means of the distance measurement instrument, the distance can be determined, and by subtracting a reference distance from the distance, it is possible to determine the thickness or an increase in the thickness of the contamination layer. Furthermore, the thickness or an increase in the thickness of the contamination layer can be utilized in optimizing the maintenance or cleaning of the thermal device, as will be presented below in connection with the method.

The invention also relates to a method for measuring the thickness of a contamination layer 160 in a boiler 100. In an embodiment, the method comprises:
- emitting electromagnetic radiation 215 from the source 210 of electromagnetic radiation to the surface 150, said radiation 215 being reflected and/or scattered from said surface 150 in the form of reflected radiation 225, the source 210 of electromagnetic radiation being arranged at a first distance $L_1$ from the surface 150;
- receiving said reflected radiation 225 by a detector 220 of electromagnetic radiation, the detector 220 of electromagnetic radiation being arranged at a second distance $L_2$ from said surface 150; and
- determining data dependent on the first and/or second distance by means of the emitted radiation 215 and the reflected radiation 225.

In this embodiment, said surface 150 is arranged in the inner part of the boiler 100. Thus, the thickness of the contamination layer 160 under or on said surface 150 can be determined by means of said data. If there is contamination, such as soot and/or ash, on the surface of the boiler, the surface 150 is the surface of the contamination layer 160, whereby the contamination layer 160 is left under the surface 150. If the corresponding surface of the boiler is clean, the thickness will be measured from the clean surface, and the thickness of the contamination layer 160 is zero, within the accuracy of measurement.

In an embodiment, the thickness of the contamination layer 160 is determined by means of a first moment of time $t_1$ and a second moment of time $t_2$ (FIG. 3a). In an embodiment, the thickness of the contamination layer 160 is determined by means of the reflection or scattering angle α, or the location point d of light focus (FIG. 3b). In an embodiment, the thickness of the contamination layer 160 is determined by means of the phase difference $\Delta\phi$ of signals (FIG. 3c).

In the method, too, the radiation source 210 used is preferably one described above in connection with the arrangement.

Also in the method, said surface 150 is the surface of the contamination layer 160 or the clean surface, the contamination layer 160 or clean surface being arranged in the inner part of the thermal device 100. For example, in the case of a boiler, the contamination layer 160 or the clean surface can be arranged on the surface of a wall 102 in the inner part of the boiler, such as a furnace 110 or a flue gas duct 116, or on the surface of a heat exchanger, such as a superheater 122, an evaporator, an economizer 124, or an air preheater 126.

In an embodiment, the method comprises:

receiving data on the distance between the light source 210 and/or the light detector 220 and the clean surface, optically measuring the distance between the light source 210 and/or the light detector 220 and the surface 150, and determining the thickness of the contamination layer 160 from the difference between said distances.

Thus, the measured distance is, by the thickness of the contamination layer 160, shorter than the distance between the light source 210 and the clean surface. Said distance between the light source 210 and/or the light detector 220 and the clean surface can be, for example, known. Alternatively, the distance between the light source 210 and the clean surface 150 can first be optically measured.

In an embodiment of the method, at least one length is determined to start with. The length refers to the first distance $L_1$, the second distance $L_2$, or another variable determined by means of the first and/or the second distance. This length constitutes a reference (reference length), i.e. an initial value for the first and/or the second distance. The reference length can be, for example, the average of the first and the second distances. Hereinbelow, it will be assumed that the third distance is short, wherein the first distance $L_1$ and the second distance $L_2$ are substantially equal. Thus, the reference length corresponds, for example, to the first distance $L_1$ in the initial situation. On the basis of this description, it will be obvious for a person skilled in the art to apply the method even in a situation in which the light source 210 and the light detector 220 are arranged at a considerable distance from each other.

Figure 7:
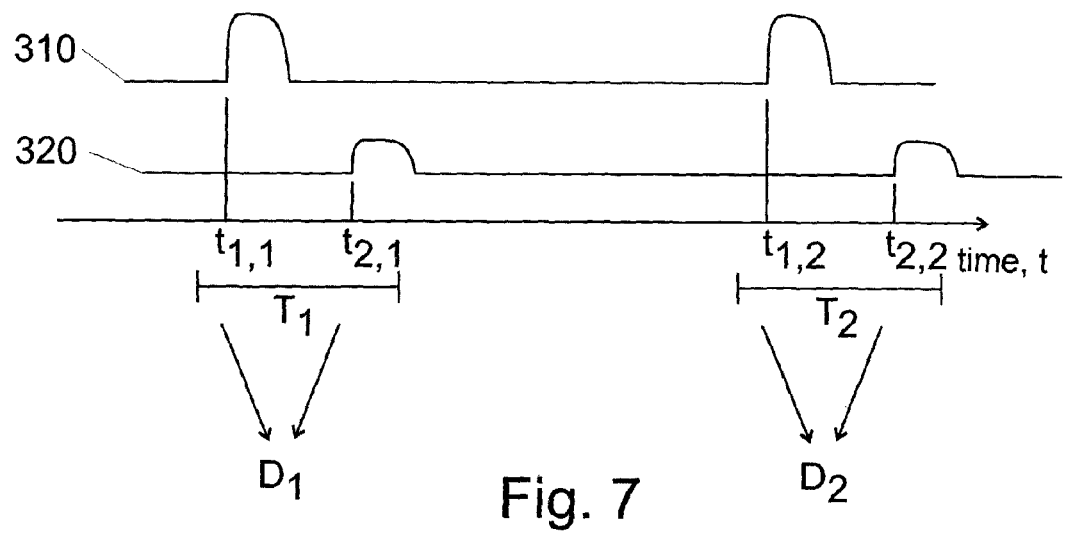
FIG. 7 shows a signal at a light source and a signal at a light detector as a function of time, during two periods of time.

With reference to FIG. 7, in this embodiment, a reference length $D_1$ is initially defined, which may be, for example, the distance of the light source 210 from the surface 150. FIG. 7 shows a signal 310 from the light source and a signal 320 from the light detector, both as a function of time. The term "initially" means in this context a situation that is considered the initial situation. In an initial situation, the boiler is in operation, whereby its components have thermally expanded according to the operation. The surface 150 may have soot removed right before the starting, wherein it is known that the thickness of the contamination layer 160 is low. It may be that the surface 150 is clean. The "lowness" of said initial thickness is of no importance for the method. For determining the reference length $D_1$, the first and/or the second distance is determined in the above described way during a first period of time $T_1$.

FIG. 7 shows a method of determining the reference length by means of time differences as shown in FIG. 3a. It is obvious that in addition or alternatively, other methods, for example those shown in FIGS. 3b to 3e, and/or other variables can be used for determining the reference length $D_1$ and/or the second length $D_2$.

Consequently, in this embodiment, data depending on the first and/or the second distance is determined in the above described way during the first period of time $T_1$, and the first length $D_1$ is determined by means of said data depending on the first and/or the second distance. For example, the first and/or the second distance can be determined in the above described way by means of a first moment of time $t_{1,1}$ and a second moment of time $t_{2,1}$. Thus, the first moment of time $t_{1,1}$ and the second moment of time $t_{2,1}$ fall into said first period of time $T_1$. For example, the first period of time $T_1$ can be a period [600 s . . . 601 s]. Thus, the boiler could have been started at a moment of time 0 s, and the first time difference is measured after ten minutes. Thus, the first time difference is measured, for example, during the period of time described above, and both of the measured moments of time $t_{2,1}$ and $t_{1,1}$ fall into this period of time. Said first time difference $t_{2,1}-t_{1,1}$ is the difference between said second $t_{2,1}$ and said first $t_{1,1}$ moments of time. In this way, the first distance $L_{1,1}$ and/or the second distance $L_{2,1}$ can be determined initially, that is, in the period of time $T_1$. In a corresponding manner, the first length $D_1$ (i.e. the reference length) can be determined in the first period of time $T_1$. For example, the first distance $L_{1,1}$ and the second distance $L_{2,1}$ can be equal. If this distance is, in the first period of time $T_1$, for example 2,998 mm, light will propagate from the source of this distance to the surface in a time of 10.00 ns and from the surface to the detector in a time of 10.00 ns. Thus, the time difference $t_{2,1}-t_{1,1}$ is 20.00 ns. The distance 2,998 mm can be regarded as said length, i.e. reference length.

Furthermore, in this embodiment, data depending on the first and/or the second distance is determined in the above described way during the second period of time $T_2$, and the second length $D_2$ is determined by means of said data depending on the first and/or the second distance. For example, the first and/or the second distance can be determined in the above described way by means of a second moment of time $t_{1,2}$ and a second moment of time $t_{2,2}$. Thus, the first moment of time $t_{1,2}$ and the second moment of time $t_{2,2}$ fall into said second period of time $T_2$. For example, the second period of time $T_2$ can be a period [3600 s . . . 3601 s]. Thus, the boiler could have been started at the moment of time 0, the second time difference being measured after an hour from that. Thus, the second time difference is measured, for example, during the second period of time described above, and both of the measured moments of time $t_{2,2}$ and $t_{1,2}$ fall into this period of time. Said second time difference $t_{2,2}-t_{1,2}$ is the difference between said second $t_{2,2}$ and said first $t_{1,2}$ moments of time. In this way, the first distance $L_{1,2}$ and/or the second distance $L_{2,2}$ can be determined during the second period of time $T_2$. By means of said first and/or second distance, it is possible to determine the second length $D_2$ in the second period of time $T_2$. For example, the first and second distances can be equal. If this distance is, in the second period of time $T_2$, for example 2,989 mm, light will propagate from the source 210 of this distance to the surface 150 in a time of 9.97 ns and from the surface 150 to the detector 220 in a time of 9.97 ns. Thus, the time difference $t_{2,2}-t_{1,2}$ is 19.94 ns. The distance 2,989 mm can be regarded as said second length $D_2$.

In this embodiment, an increase in the thickness of the contamination layer 160 is also determined by means of said first length $D_1$ and said second length $D_2$. In the above described example case, because the second length is 9 mm shorter than the first length ($D_1-D_2=9$ mm), it can be concluded that the thickness of the contamination layer 160 has increased 9 mm between the time period $T_1$ and the time period $T_2$ (see also FIG. 2).

If the length corresponding to the situation of a clean surface is otherwise known, it is possible to determine the first thickness of the contamination layer 160 initially, that is, in the period of time $T_1$. This can be determined, for example, from the first difference of time $t_{2,1}-t_{1,1}$ or from said first length $D_1$. By subtracting this length from the known length corresponding to the situation of a clean surface, it is possible to determine the thickness of the contamination layer 160 at first. In addition, it is possible to determine the second thickness of the contamination layer in a second period of time $T_2$. This can be determined, for example, from the second difference of time $t_{2,2} - t_{1,2}$ or from said second length $D_2$. By means of the thickness of the contamination layer 160, it is possible to make a decision on conducting operations. For example, on the basis of the measurement in the period of time $T_1$, a decision can be made to disregard the operations. For example, on the basis of the measurement in the period of time $T_2$, a decision can be made to conduct operations. In this way, it is possible to optimize the moment of time of conducting operations, such as removing soot, in thermal processes.

In a corresponding way, in an embodiment, the processing unit 230 is configured to determine information dependent on the first and/or second distance by means of emitted radiation 215 and reflected radiation 225. In an embodiment, the processing unit 230 is configured to determine the first and/or the second distance. In an embodiment, the processing unit 230 is configured to receive the reference length and to subtract said first and/or second distance from the reference length, for determining the thickness of the contamination layer. In an embodiment, the processing unit 230 is configured to determine said reference length.

Furthermore, in some cases, for example if the period of time $T_1$ refers to a time very soon after removing soot, the first thickness of the contamination layer can be assumed to be zero. In other words, the surface 150 is assumed to be clean. Thus, the above described increase in the thickness of the contamination layer directly represents the thickness of the contamination layer 160. In the above described example case, because the second length $D_2$ is 9 mm shorter than the first length $D_1$ ($D_1 - D_2 = 9$ mm), the thickness of the soot and ash layer 160 can be concluded to be 9 mm in the period of time $T_2$, if it is known that the thickness of the contamination layer 160 in the period of time $T_1$ was zero.

The accuracy of the method can be improved by statistical methods. For example, one length used can be a statistical measure of a set of several length components. The statistical measure can be, for example, the average, the median, the average of a given subset, or the median of a given subset. Said subset can be selected, for example, in such a way that the subset only consists of such length components of said several length components which are at a given distance from a statistical number, such as the average or the median. Said given distance can depend, for example, on the deviation, and it can be, for example, the standard deviation, twice the standard deviation, or three times the standard deviation.

For example, the length can be determined as an average of several length components. Furthermore, it should be mentioned that in this context, the term length component refers to the first distance (i.e. the distance between the light source 210 and the surface 150), the second distance (i.e. the distance between the light detector 220 and the surface 150), or another variable which is determined by means of the first and/or the second distance. In an embodiment, said first and/or second distance can be determined by means of a first moment of time $t_{i,1,k}$ and a second moment of time $t_{i,2,k}$. In an embodiment, it is possible to use data about the angle $\alpha$ for determining the first distance (and the length component).

Figure 8:
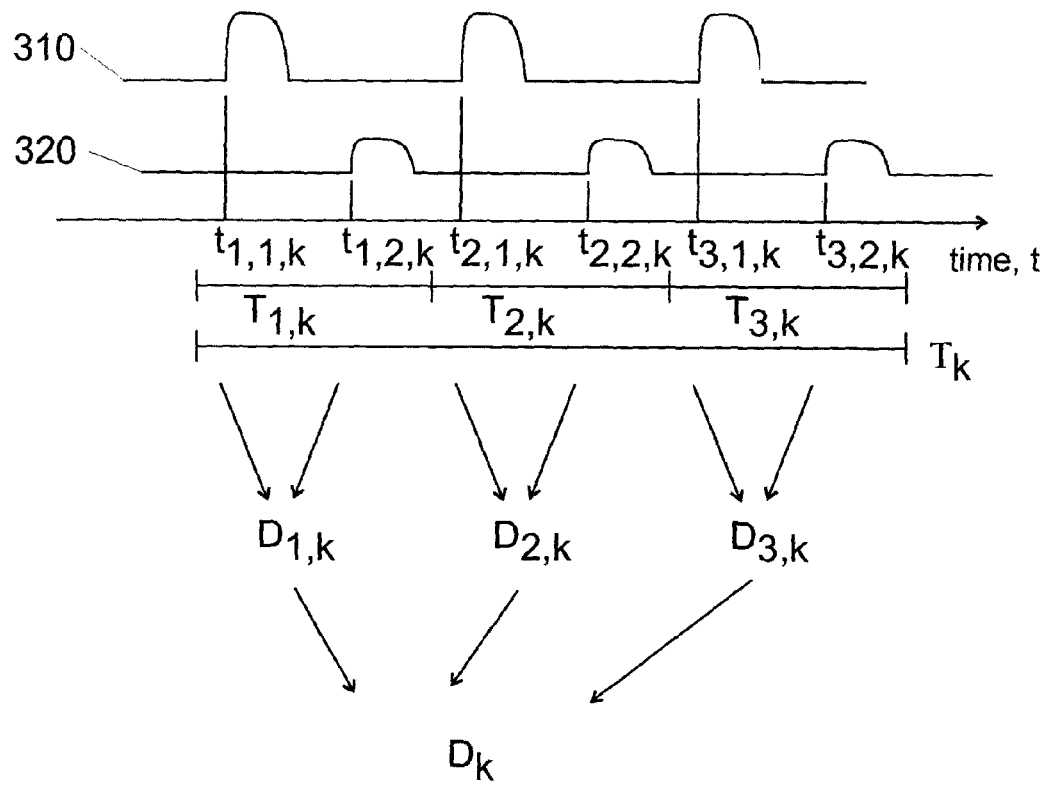
FIG. 8 shows a signal at a light source and a signal at a light detector as a function of time during three periods of time, the time periods constituting a time span.

With reference to FIG. 8, for example the above mentioned first length $D_1$ can be determined as a statistical measure for a first set of length components. In FIG. 8, the method is shown more generally for a length $D_k$, in which k is a running number for the length, i.e. the running number of the set of length components. In FIG. 7, the determination of two different lengths was shown. FIG. 8 shows the determination of several different length components, as well as the determination of a single length by means of several length components. In FIG. 8, the above mentioned single length has been indicated with the symbol $D_k$, but it is obvious that the index k may vary according to the need, wherein it is possible to determine several lengths (the first, the second, the third, . . . , the $k^{th}$, etc.) in a corresponding way.

The first (more generally, $k^{th}$) set of length components comprises first length components $D_{1,1}$, $D_{2,1}$ and $D_{3,1}$; more generally, the length components $D_{1,k}$, $D_{2,k}$ and $D_{3,k}$ shown in the figure. Each length component $D_{i,k}$ of the $k^{th}$ set of length components is determined in the above described way in a period of time $T_{i,k}$; in which i is the index for the length component and k is the index for the set of length components; in FIG. 8, i is 1, 2, or 3. The value of the length component $D_{i,k}$ can be determined, for example, by means of a first moment of time $t_{i,1,k}$ and a second moment of time $t_{i,2,k}$, in which i is the index for the component and k is the index for the set. By means of these moments of time, it is possible to determine the first and/or the second distance for the given index values i and k. Alternatively or in addition, it is possible to determine a phase difference $\Delta\phi_{i,k}$ by means of which the first and/or the second distance can be determined for the given index values i and k in the period of time $T_{i,k}$. In a corresponding manner, angular and/or location data (FIG. 3b) could be used.

Precisely these first and/or second distances are used for determining the length components $D_{i,k}$ for several indices i and k. The length $D_k$ corresponding to the set of length components k is obtained as a statistical measure for the set of length components, for example as an average of all the values $D_{i,k}$, when k is given and i is variable. For example in the case of the average, $$D_k = \frac{1}{N_k} \sum_{i=1}^{N_k} D_{i,k},$$

where $N_k$ is the number of length components in the set k.

In a corresponding manner, the periods of time $T_{i,k}$ cover a time span $T_k$. In other words, the time span $T_k$ is the union of the periods of time $T_{i,k}$ with all values of i and with the given value of k, as shown in FIG. 8. When the thickness of the contamination layer 160 is measured, the surface of the boiler 150 often moves with respect to the light source 210 and/or the light detector 220. The movement can be manifested, for example, as vibration of heat exchanger pipes or fluttering of heat exchanger pipes. It has been found that fluttering is relatively slow in boiler conditions. Consequently, measurements should be taken for a relatively long period of time, to secure that the statistical material is sufficiently extensive. It has been found that the length of the time span $T_k$ is advantageously at least 30 s, more advantageously at least 1 min, and more preferably at least 2 min. Furthermore, it has been found that the number of values of length components $D_{i,k}$ determined for the set of length components is advantageously 10 ($N_k = 10$), more advantageously 20 ($N_k=20$), and more preferably 50 ($N_k=50$) in at least one set k. Preferably, several length components are determined in each set k.

Moreover, the periods of time $T_{i,k}$ are preferably equally long or approximately equally long. In an embodiment, measurements are taken at regular intervals during a time span $T_k$, when all the periods of time $T_{i,k}$ for a given time span index k are equally long. In an embodiment, the longest period of time in a time span $T_k$ is not greater than five times the shortest period of time; in other words, for a given value of the index k, $\max(m(T_{i,k}))/\min(m(T_{i,k})) \leq 5$ applies, where $m(T_{i,k})$ refers to the length of the period $T_{i,k}$ in time. When calculating the maximum and the minimum, the value of the index i varies. Such an even or relatively even distribution of measurements has the advantage that all the distances are weighted in the same way in the measurements. Said ratio can also be not greater than 3 or not greater than 2. In an embodiment, measurements are taken at regular intervals during all time spans $T_k$, when all the periods of time $T_{i,k}$ are equally long. In an embodiment, the longest period of time in all time spans $T_k$ is not greater than five times the shortest period of time; in other words, for all values of the index k, $\max(m(T_{i,k}))/\min(m(T_{i,k})) \leq 5$ applies. Also in this case, when calculating the maximum and the minimum, the value of the index i varies. Said ratio can also be not greater than 3 or not greater than 2. Such a measurement arrangement may be technically easy to implement, because the same sampling frequency can be applied for all time spans.

In an embodiment, the processing unit 230 is configured
to determine data depending on the first and/or the second distance by any of the above-described ways during several periods of time $T_{i,1}$ and to determine several length components $D_{i,1}$ by means of said data depending on the first and/or the second distance, each length component $D_{i,1}$ relating to said period of time $T_{i,1}$, and
to determine a first thickness of the contamination layer 160 statistically by applying said several length components $D_{i,1}$.

Furthermore, it has been found that the length of the time span $T_k$ should not be too long, because then the contamination layer 160 has time to grow during the measurements. It has been found that the length of the time span $T_k$ is advantageously not longer than 15 min, more advantageously not longer than 10 min and more preferably not longer than 5 min.

In an embodiment, the method comprises:
determining data depending on the first and/or the second distance by any of the above-described ways during several periods of time $T_{i,1}$ and determining several length components $D_{i,1}$ by means of said data depending on the first and/or the second distance, each length component D relating to said period of time $T_{i,1}$,
determining a first thickness of the contamination layer 160 by applying said several length components $D_{i,1}$. The thickness of the contamination layer can be determined statistically by applying said several length components.

In this embodiment, for example the reference length (the first length), such as the reference distance, can at first be determined as an average of several measurements. Initially, it can also be assumed that the thickness of the contamination layer 160 is zero, wherein the reference length can be used for computing the thickness of the contamination layer 160 later on. Later, the length can be measured by one or more measurements.

For example, the first length can be measured in the above described way in three periods of time $T_{1,1}$, $T_{2,1}$ and $T_{3,1}$, wherein the measured length components can be $D_{1,1}=2,996$ mm, $D_{2,1}=2,998$ mm and $D_{3,1}=2,999$ mm. If the average is used as said statistical measurement, it can be concluded that the first length is about 2,997.7 mm.

In an embodiment, the length to be measured later only is also determined as the statistical measurement of several length components. This embodiment of the method further comprises
determining other data depending on the first and/or the second distance by any of the above-described ways during several other periods of time $T_{i,k}$ (k>1), and determining several other length components $D_{i,k}$ (k>1) by means of said other data depending on the first and/or the second distance, each other length component $D_{i,k}$ (k>1) relating to said other period of time $T_{i,k}$ (k>1),
defining an increase in the thickness of the contamination layer 160 by applying said several length components $D_{i,1}$ and said several other length components $D_{i,k}$ (k>1).

For example, the second length can be measured in the above described way in two periods of time $T_{12}$ and $T_{22}$, wherein it is possible to measure the length components $D_{1,2}=2,988$ mm and $D_{2,2}=2,990$ mm. From this, it is possible, for example, to conclude that the second length is about 2,989 mm. Furthermore, it is possible to conclude that the increase in the thickness of the contamination layer is about 2,997.7 mm minus 2,989 mm, i.e. about 8.7 mm.

As presented above, the increase in the thickness may, in some cases, represent the thickness.

Also in this embodiment, said several periods of time or said several other periods of time cover a time span whose length is sufficiently long. The sufficient length has been discussed above. In a corresponding manner, the advantageous number of measurement points has been discussed earlier.

In an embodiment, the processing unit 230 is configured
to determine data depending on the first and/or the second distance by any of the above-described ways during several periods of time $T_{i,1}$ and to determine several length components $D_{i,1}$ by means of said data depending on the first and/or the second distance, each length component D relating to said period of time $T_{i,1}$, and
to determine a first thickness of the contamination layer 160 statistically by applying said several length components $D_{i,1}$.

Further, in this embodiment, the processing unit 230 is configured
to determine other data depending on the first and/or the second distance by any of the above-described ways during several other periods of time $T_{i,k}$ (k>1), and to determine several other length components $D_{i,k}$ (k>1) by means of said other data depending on the first and/or the second distance, each other length component $D_{i,k}$ (k>1) relating to said other period of time $T_{i,k}$ (k>1), and
to define an increase in the thickness of the contamination layer 160 statistically by applying said several length components $D_{i,1}$ and said several other length components $D_{i,k}$ (k>1).

The information obtained about the contamination layer 160 or its thickness can be utilized, for example, in cleaning or maintaining the boiler. The cleaning or maintenance operations can be automated to be conducted, for example, when the thickness of the contamination layer 160 exceeds a limit value. The cleaning or maintenance operations can be automated to be conducted, for example, only when the increase in the thickness of the contamination layer 160 exceeds a limit value.

A method for maintaining the boiler 100 comprises:
(i) determining the thickness of the contamination layer 160 in any of the above described ways, or
(ii) determining the increase in the thickness of the contamination layer 160 in any of the above described ways,
comparing said thickness of the contamination layer 160 or said increase in the thickness of the contamination layer 160 with the limit value, and
if the thickness or the increase in the thickness of the contamination layer 160 exceeds said limit value, conducting an operation, such as a cleaning or maintenance operation, for example removing soot or washing, and
if the thickness or the increase in the thickness of the contamination layer 160 is not higher than said limit value, disregarding said operation, such as a cleaning or maintenance operation, for example removing soot or washing.

Disregarding the operation means that said operation is held off for some time. Said some time can be, for example, the time to the next measurement operation, in which the thickness of the contamination layer 160 or an increase in the thickness of the contamination layer 160 is determined again. Said some time can be, for example, a second, a minute, an hour, a day, or a week. In the above described method, equility can alternatively be selected to refer to disregarding the operation; in other words, an embodiment comprises
comparing said thickness of the contamination layer 160 or said increase in the thickness of the contamination layer 160 with the limit value, and
if the thickness or the increase in the thickness of the contamination layer 160 is at least equal to the limit value, conducting the operation, and
if the thickness or the increase in the thickness of the contamination layer 160 is lower than said limit value, disregarding the operation.

Both embodiments comprise, depending on the result of the comparison, either conducting the operation or disregarding the operation. Said limit value can be, for example, 5 mm, 10 mm, 25 mm, or 50 mm.

An embodiment of the method comprises cleaning of the boiler 100. The cleaning may comprise, for example, removing soot and/or washing. In an embodiment, the cleaning is implemented by removing soot the inner surface of the thermal device 100. In particular, it is possible to remove soot exactly the surface 150 where the thickness or the increase in the thickness of the contamination layer has been measured.

As presented above in connection with particularly FIGS. 5b1 to 5b3, an embodiment of the method comprises emitting radiation towards a first point of the surface 150 for measuring the distance. Referring to FIG. 5b1, this embodiment comprises
emitting electromagnetic radiation from the source 210 of electromagnetic radiation to the surface 150, to a first point of the surface 150, said radiation 215 being reflected and/or scattered in the form of reflected radiation 225 from said surface 150, the source 210 of electromagnetic radiation being arranged at a first distance $L_1$ from the first point of said surface 150;
receiving said reflected radiation 225 by a detector 220 of electromagnetic radiation, the detector 220 of electromagnetic radiation being arranged at a second distance $L_2$ from said first point of said surface 150; and
determining data dependent on the first and/or second distance by means of the emitted radiation 215 and the reflected radiation 225.

Referring to FIG. 5b2, an embodiment of the method comprises emitting radiation, alternatively or in addition, towards a second point of the surface 150, for measuring the distance. This embodiment comprises
moving and/or turning the source 210 of electromagnetic radiation for emitting radiation to a second point of the surface 150,
emitting electromagnetic radiation from the source 210 of electromagnetic radiation to the second point of the surface 150, said radiation 215 being reflected and/or scattered in the form of reflected radiation 225 from said surface 150, the source 210 of electromagnetic radiation being arranged at a third distance $L_3$ from the second point of said surface 150;
receiving said reflected radiation 225 by a detector 220 of electromagnetic radiation, the detector 220 of electromagnetic radiation being arranged at a fourth distance $L_4$ from said second point of said surface 150; and
determining data dependent on the third and/or fourth distance by means of the emitted radiation 215 and the reflected radiation 225.

Compared with FIG. 5b1, in FIG. 5b2 the source 210 of electromagnetic radiation has merely been turned.

Referring to FIG. 5b2, an embodiment of the method comprises emitting radiation, alternatively or in addition, towards a first point of the second surface 150b, for measuring the distance. This embodiment comprises
moving and/or turning the source 210 of electromagnetic radiation for emitting radiation to a first point of the second surface 150b,
emitting electromagnetic radiation from the source 210 of electromagnetic radiation to the second surface 15b0, to a first point of the second surface 150b, said radiation 215 being reflected and/or scattered in the form of reflected radiation 225 from said second surface 150b, the source 210 of electromagnetic radiation being arranged at a fifth distance $L_5$ from the first point of said second surface 150b;
receiving said reflected radiation 225 by a detector 220 of electromagnetic radiation, the detector 220 of electromagnetic radiation being arranged at a sixth distance $L_6$ from said first point of said second surface 150b; and
determining data dependent on the fifth and/or sixth distance by means of the emitted radiation 215 and the reflected radiation 225.

Compared with FIG. 5b1, in FIG. 5b3 the source 210 of electromagnetic radiation has merely been moved.

By means of the first and/or the second distance ($L_1$, $L_2$), it is possible to determine the thickness or the increase in the thickness of the contamination layer 160 at the first point of the surface 150, as presented above. In a corresponding way, by means of the third and/or fourth distance ($L_3$, $L_4$), it is possible to determine the thickness or the increase in the thickness of the contamination layer 160 at the second point of the surface 150. In a corresponding way, by means of the fifth and/or sixth distance ($L_5$, $L_6$), it is possible to determine the thickness or the increase in the thickness of the contamination layer 160 at the first point of the second surface 150b. Statistical methods, for example the above described statistical methods, can also be utilized in at least one of the following:

determining the thickness or the increase in the thickness of the contamination layer 160 at the first point of the surface 150, determining the thickness or the increase in the thickness of the contamination layer 160 at the second point of the surface 150, and determining the thickness or the increase in the thickness of the contamination layer 160 at the first point of the second surface 150b.

The invention claimed is:

1. An arrangement comprising:
a thermal device selected from the group consisting of: a boiler, a gasification reactor, a pyrolysis reactor, and a torrefaction reactor, having walls which enclose inner parts of the thermal device;
an inner surface of the thermal device which has the property of at least one of reflecting and scattering electromagnetic radiation;
a laser source for producing an electromagnetic radiation signal directed at the inner surface, the laser source outside the thermal device arranged at a first distance from said surface;
a detector of electromagnetic radiation arranged at a second distance from said inner surface and in electromagnetic radiation receiving relation to receive reflected electromagnetic radiation from said inner surface;
a window or an aperture configured to transmit an electromagnetic radiation signal from the laser source to said inner surface;
an extending pipe positioned so that the electromagnetic radiation signal from the laser source passes through the pipe;
a source of protective gas connected to the pipe to supply protective gas to the pipe;
a processing unit connected to the detector to determine a distance between said inner surface and the detector to determine a first length, and to periodically compare said first length to a second length produced by repeating the determination of the distance between said inner surface and the detector, to measure a growth in contamination on the inner surface;
a cleaning device for cleaning the inner surface of the thermal device;
a control device for controlling said cleaning device, connected to the processing unit in data receiving relation to operate the cleaning device when the inner surface has a selected thickness of contamination on the inner surface.

2. The arrangement according to claim 1, wherein
the laser source is configured to emit light at least at a wavelength between 300 nm and 800 nm; and
the detector of electromagnetic radiation is configured to receive reflected light having said wavelength.

3. The arrangement according to claim 1, wherein the processing unit is configured to determine the thickness of the contamination layer in such a way that said inner surface is a surface of said contamination layer.

4. The arrangement according to claim 1, wherein the laser source is configured to be at least one of movable, and turnable in relation to the inner surface.

5. A method for measuring a thickness of a contamination layer or an increase in the thickness of the contamination layer in a thermal device, wherein the thermal device is a boiler, a gasification reactor, a pyrolysis reactor, or a torrefaction reactor, the thermal device comprises walls enclosing inner parts of the thermal device, and an inner surface is arranged in the inner part of the thermal device, wherein at least one of the walls of the thermal device further comprises a window or an aperture configured to transmit an electromagnetic signal from said laser source to said surface, and an extending pipe positioned so that the electromagnetic radiation signal from the laser source passes through the pipe the method comprising the steps of:
supplying protective gas to said pipe;
emitting electromagnetic radiation from a laser source to the surface so that electromagnetic radiation is at least one of reflected and scattered in the form of reflected electromagnetic radiation from said inner surface, the laser source being arranged at a first distance from said surface and outside the thermal device;
receiving said reflected electromagnetic radiation by a detector of electromagnetic radiation, the detector of electromagnetic radiation being arranged at a second distance from said surface;
determining a first length, during a first period of time, with the emitted electromagnetic radiation and reflected electromagnetic radiation, a first data dependent on at least one of the first and the second distance, and by uses of said first data;
determining a second length, during a second period of time, with the emitted electromagnetic radiation and reflected electromagnetic radiation, a second data dependent on at least one of the first and the second distance, and by uses of said second data;
determining from the first length and the second length, the increase in the thickness of the contamination layer or the thickness of the contamination layer by using the first length as an initial reference length;
comparing the increase in the thickness or the thickness of the contamination layer to a limit value; and
cleaning the inner surface when the increase in the thickness or the thickness of the contamination layer exceeds the limit value.

6. The method of claim 5 further comprising using an electromagnetic radiation distance measurement instrument during the operation of the thermal device.

7. The method according to claim 5, wherein the emitting electromagnetic radiation is at a wavelength between 300 nm and 800 nm, and receiving electromagnetic radiation having said wavelength.

8. The method according to claim 5, wherein said inner surface is a surface of a contamination layer, the contamination layer being arranged on a surface of a wall in the inner part of the thermal device.

9. The method according to claim 5, wherein the step of determining from the first length and the second length, the increase in the thickness or the thickness of the contamination layer are statistically determined over several periods of time.

10. The method according to claim 9, wherein said several periods of time cover a time span of least 30 seconds.

* * * * *